United States Patent
Watanabe et al.

(10) Patent No.: US 12,020,592 B2
(45) Date of Patent: Jun. 25, 2024

(54) EFFICIENTLY MANAGE AND SHARE RESOURCES DURING E-LEARNING

(71) Applicant: International Business Machines Corporation, Armonk, NY (US)

(72) Inventors: Shoichiro Watanabe, Tokyo (JP); Kenichi Takasaki, Tokyo (JP); Daisuke Maruyama, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 17/507,870

(22) Filed: Oct. 22, 2021

(65) Prior Publication Data
US 2023/0129473 A1   Apr. 27, 2023

(51) Int. Cl.
*G09B 5/00* (2006.01)
*G06F 16/951* (2019.01)

(52) U.S. Cl.
CPC .............. *G09B 5/00* (2013.01); *G06F 16/951* (2019.01)

(58) Field of Classification Search
CPC .............. G09B 5/00; G09B 5/06; G09B 5/12
See application file for complete search history.

(56) References Cited

U.S. PATENT DOCUMENTS

| 8,321,793 B1* | 11/2012 | Cotter | G06F 16/9535 |
| | | | 715/744 |
| 2006/0210955 A1* | 9/2006 | Skoglund | G09B 7/00 |
| | | | 434/236 |
| 2013/0042007 A1* | 2/2013 | Linton | G06Q 10/10 |
| | | | 709/226 |
| 2014/0024009 A1* | 1/2014 | Nealon | G09B 5/12 |
| | | | 434/362 |
| 2016/0180724 A1* | 6/2016 | Frith, Jr. | G09B 5/06 |
| | | | 434/322 |
| 2016/0314699 A1* | 10/2016 | Brinton | G09B 7/00 |
| 2016/0358489 A1* | 12/2016 | Canter | G06N 5/04 |
| 2016/0358493 A1 | 12/2016 | Bilic et al. | |
| 2016/0364993 A1* | 12/2016 | Chetlur | G06F 9/542 |

(Continued)

FOREIGN PATENT DOCUMENTS

| CN | 111460249 A | 7/2020 |
| JP | 2004178521 A | 6/2004 |

(Continued)

OTHER PUBLICATIONS

Shi et al., "A learning path recommendation model based on a multidimensional knowledge graph framework for e-learning" Knowledge-Based Systems, vol. 195 (2020), 11 pages.

(Continued)

*Primary Examiner* — Peter R Egloff
(74) *Attorney, Agent, or Firm* — Cantor Colburn LLP; Robert D. Bean

(57) ABSTRACT

Aspects of the invention include receiving an identity of a primary web-based material from a user, wherein the primary web-based material describes a topic. Subparts of the primary web-based material are indexed. Supplemental web-based materials accessed by a plurality of reference users are retrieved, wherein the supplemental web-based materials relate to the subparts. A sequence of supplemental web-based materials is generated for the user to follow to gain an understanding of the topic.

17 Claims, 6 Drawing Sheets

(56) References Cited

U.S. PATENT DOCUMENTS

| | | | |
|---|---|---|---|
| 2018/0090022 A1* | 3/2018 | Bouillet | G09B 5/12 |
| 2018/0197428 A1* | 7/2018 | Baphna | G09B 7/00 |
| 2019/0259289 A1* | 8/2019 | Bhattacharya | G09B 7/08 |
| 2021/0247882 A1* | 8/2021 | Norman | G06F 3/0484 |

FOREIGN PATENT DOCUMENTS

| | | |
|---|---|---|
| JP | 2005346229 A | 12/2005 |
| JP | 2007293252 A | 11/2007 |
| JP | 2010277046 A | 12/2010 |

OTHER PUBLICATIONS

Tik et al., "Ultra-high-field fMRI insights on insight: Neural correlates of the Aha!-moment" HUman Brain Mapping, vol. 39, Issue 8, (2018): 26 pages.

Xia et al., "PeerLens: Peer-Inspired Interactive Learning Path Planning in Online Question Pool" CHI Conference on Human Factors inComputing Systems Proceedings, May 4-9, 2019, 12 pages.

* cited by examiner

EFFICIENTLY MANAGE AND SHARE RESOURCES DURING E-LEARNING

BACKGROUND

The present invention generally relates to programmable computing systems, and more specifically, to programmable computing systems configured to efficiently manage and share resources during e-learning.

A search engine is a web-based tool that receives a search query from a user and carries out a web-based search to output results. The search engine retrieves the results in the form of videos, websites, and news articles. The user receives the search results in the form of ordered lists on a user interface displayed on the user's computer. The search engine further includes a link with each result that allows the user to be sent to the source of the result. The user receives the results based on an algorithm and is unable to learn from other user's experiences with the returned results.

SUMMARY

Embodiments of the present invention are directed to a computer-implemented method for the efficient management and sharing of resources during e-learning. A non-limiting example of the computer-implemented method includes receiving an identity of a primary web-based material from a user, wherein the primary web-based material describes a topic. Subparts of the primary web-based material are indexed. Supplemental web-based materials accessed by a plurality of reference users are retrieved, wherein the supplemental web-based materials relate to the subparts. A sequence of supplemental web-based materials is generated for the user to follow to gain an understanding of the topic.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
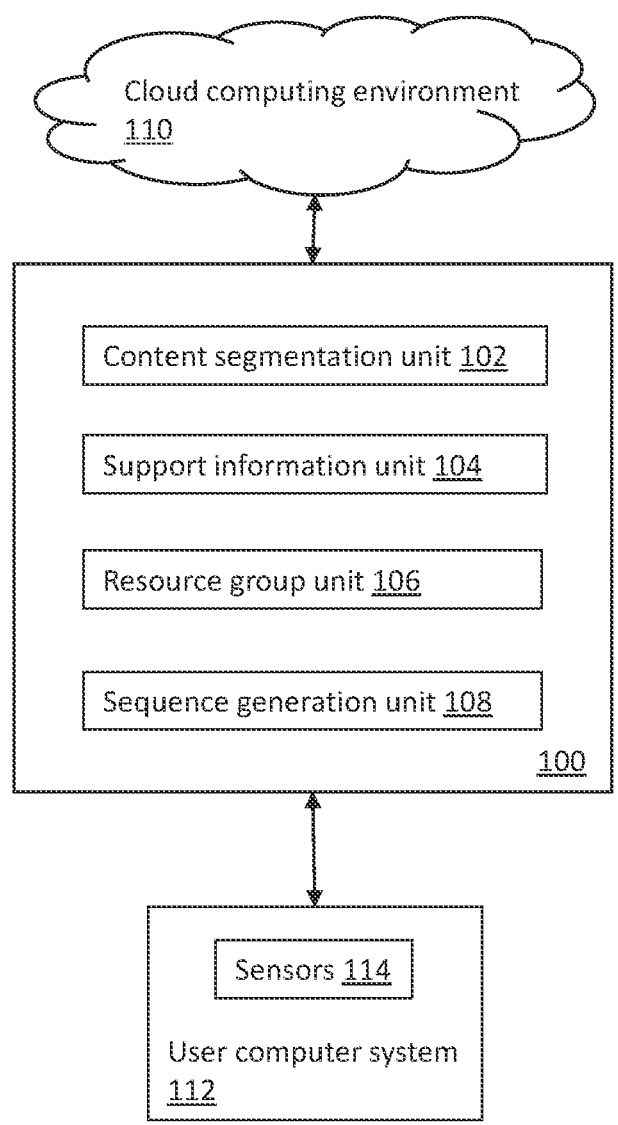
FIG. 1 illustrates a system for the efficient management and sharing of resources during e-learning according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computer systems, and computer program products that allow a user to enter a web query on a particular topic that the user has difficulty understanding. Rather than provide random search results, the computer-implemented methods, computer systems, and computer program products create a sequence of web-based results for the user to review. The sequence is selected such that each web-based result builds on the explanation of the previous web-based result. As the user reviews each result in the sequence, the user's understanding of the topic is enhanced. The user continues to view each subsequent web-based result until the user is satisfied with their understanding of the particular topic.

Electronic learning (e-learning) is a formal or informal learning experience in which a user searches for and receives educational content via a web-based application. In some instances, a user is a student in a formal online learning course, whereas, in other instances, the user is engaged in an informal self-initiated learning. In each instance, the user will, from time to time, have difficulty understanding a topic. The user will enter a search query into a search engine to browse the web for additional materials. The user will likely receive a ranked list of results that are related to the topic. These results will be ranked by the search engine in terms of relevance to the user's search query. The results will not, however, be ordered in any sequence designed to enhance the user's understanding of the topic.

One or more embodiments of the present invention address one or more of the above-described shortcomings by providing computer-implemented methods, computer systems, and computer program products that receive web-based content that describes a topic that a user has difficulty understanding. The web-based content is subdivided into sub-parts based on the sub-topics described in the web-based content. The browsing histories of reference users are searched to identify supplemental web-based materials that describe each sub-topic. The browsing histories are further analyzed to identify the respective order in which the references users accessed each supplemental web-based material. Based on a user's preferences and the respective orders the reference users accessed the supplemental web-based materials, a personalized sequence of supplemental web-based materials is created for the user to access and enhance his or her understanding of the topic.

Referring to FIG. 1, a system 100 for the efficient management and sharing of resources during e-learning is shown in accordance with one or more embodiments of the present invention. The system 100 includes a content segmentation unit 102 for analyzing a primary web-based content and identifying the subparts of the file. The primary web-based content includes, for example, an instructional video, an electronic book (e-book), an audio instructional course, and an informational website. The system 100 further includes a support information unit 104 for analyzing each subpart and retrieving supplemental web-based materials that enhance the user's comprehension of the primary web-based content. The supplemental web-based materials includes, for example, an instructional video, an e-book, an audio instructional course, and an informational website that is distinct from the primary web-based content. The system 100 further includes a resource group unit 106 the analyzes each supplemental web-based materials and creates groups of supplemental web-based materials based on detected similarities. The system 100 further includes a sequence generation unit 108 for creating a personalized sequence of supplemental web-based materials that best leads the user to an understanding of the primary web-based content. It should be appreciated that all or a portion of the functionality described herein can be performed on the cloud computing environment 50 illustrated in FIG. 4, or the computer system 600 illustrated in FIG. 6.

The content segmentation unit 102 receives the primary web-based content and identifies the subtopics presented in the primary web-based content. Each identified subtopic is considered a subpart of the primary web-based content. The content segmentation unit 102 identifies the subtopics using various techniques based on a format of the primary web-based content. For example, if the primary web-based content is an electronic book (e-book) or an audiobook, each chapter of the book is a subpart. The content segmentation unit 102 reads the table of contents or the index of the e-book and identifies the memory addresses of each book chapter. In this instance, each subpart is identified by the memory addresses of each chapter of the e-book.

In the instance that the primary web-based content is a website or webpage, the content segmentation unit 102 can analyze the metadata associated with the website to find annotations describing the content. The annotations are descriptors included in the website metadata that describe different sections of the website or webpage. The content segmentation unit 102 then uses natural language processing (NLP) techniques to derive meaning from the annotations and determine the boundaries of the sections on the website. The content segmentation unit 102 then determines the memory addresses for each section. Each subpart is identified by the memory addresses of each section of the website or webpage.

In the instance that the primary web-based content is a video, the content segmentation unit 102 can use natural language processing (NLP), Hidden Markov models, N-grams, and neural networks to perform speech recognition on an audio portion of the video. For example, the content segmentation unit 102 receives a soundwave, and samples subsets of the waveform. For each subset, the content segmentation unit 102 performs a Fourier transform to decompose the wave subset into constituent waves of different frequencies. The content segmentation unit 102 then calculates and energy associated with each frequency to determine which frequency dominates the sound described by the subset. The content segmentation unit 102 repeats this process for each subset of the waveform. This processed data is fed into a neural network, for example, a recurrent neural network that predicts each sound based on a previous sound. For example, if the sound is "to", a subsequent sound is more likely to be "day", rather than something unpronounceable such as "rtz". The predicted sounds are then mapped to the most likely letters that form the sounds. Thus an audio soundwave is converted to text. The content segmentation unit 102 then inputs the textual words into another neural network, which executes a word-embedding model to derive meaning from the text. Based on the meaning of the text, the content segmentation unit 102 determines which sections are taught by the video. The content segmentation unit 102 then identifies a time interval from the beginning and end of each section. The content segmentation unit 102 identifies each time interval as a subpart of the video.

The support information unit 104 retrieves the supplemental web-based materials, and associates the materials with subparts of the primary web-based material. For example, the primary web-based material is a chemistry e-book, and one of the subparts describes valence-shell electron-pair repulsion (VSPR) theory. In this instance, a first supplemental web-based material is a video explaining VSPR theory, and a second supplemental web-based material is a Wiki article on VSPR theory.

The support information unit 104 receives the memory addresses of the subparts from the content segmentation unit 102. The support information unit 104 uses the memory addresses to retrieve a subpart, and analyzes the contents to determine the topic described by the subpart. In some embodiments of the present invention, the support information unit 104 includes one or more neural networks for discerning the content of the subpart. If, for example, the primary web-based material includes a visual component (e.g., a video), the support information unit 104 employs a neural network suitable for analyzing time-series data. The support information unit 104 employs a model that executes computer vision techniques on the frames of the video for object detection. Object detection includes both image classification and object localization. Image classification includes predicting a class of one or more objects in the video. To perform image classification, the support information unit 104 retrieves the subpart of the video from memory, as an input and outputs a class label in the form of one or more integer values mapped to class values. Object localization includes identifying a location of one or more identified objects in the subpart of the video. To perform object localization, the support information unit 104 processes the received video and outputs one or more bounding boxes, which define a spatial relationship of the objects in a frame of the video. The support information unit 104 is implemented through a neural network that is trained to detect objects from a particular domain (e.g., plastic welding) by adjusting its weights and biases. An exemplary embodiment, the support information unit 104 employs a trained artificial neural network to execute the model, for example, a gated recurrent unit (GRU) neural network, or other neural network appropriate for time-series image analysis.

If, for example, the subpart includes a textual or audio component, the support information unit 104 can execute a neural network that applies a word-embedding model to discern the content of the subpart. For example, the primary web-based material is an e-book, a Wiki article, a journal article, an audio portion of a video, or other textual or audio file. The support information unit 104 can apply natural language processing techniques, via a model, to semantically analyze the audio or textual component of the educational file. The model can be, for example, a word embedding model. The support information unit 104 receives the audio or textual component of the educational file and segment it into passages (e.g., paragraphs, sections, etc.). The support information unit 104 further segments the passages into tokens (e.g., words and phrases). The support information unit 104 retrieves individual passages and maps the tokens in the passage to respective words vectors in a low-dimensional space.

Various techniques can then be applied to derive a context of a text document. For example, the support information unit 104 can take a target word from the low-dimensional space and attempt to predict the surrounding context words from it. In another embodiment of the present invention, the support information unit 104 analyzes the context of the words surrounding a masked target word and seeks to predict the target word based on the surrounding words. The support information unit 104 can be implemented through a neural network type trained to semantically analyze text from a particular domain (e.g., food preparation domain) by adjusting its weights and biases. In an exemplary embodiment, the text support information unit 104 employs a trained artificial neural network, for example, a recurrent neural network (RNN), or other neural network appropriate for textual or audio analysis.

In each case, once the support information unit 104 discerns a topic described by the subpart, the support information unit 104 performs a web search for supplemental web-based materials. For example, the support information unit 104 determines the topic of a subpart of a primary web-based material. The support information unit 104 then uses the topic to retrieve supplemental web-based materials. The support information unit 104 can execute various techniques to retrieve the supplemental web-based materials. The support information unit 104 can cross-reference topic descriptions with file titles. Using the example from above, if the primary web-based material relates to chemistry and a subpart relates to VSPR theory, the support information unit 104 can use the browser history of the reference users to perform a search for supplemental web-based materials related to VSPR theory. The support information unit 104 then retrieves the uniform resource locator (URLs) for the supplemental web-based materials. The support information unit 104 can also access an ontology to determine search terms that relate to VSPR theory. Therefore, The support information unit 104 then further searches the reference users' browser histories for terms derived from the ontology. The support information unit 104 then retrieves the uniform resource locator (URLs) for the supplemental web-based materials detected based on the derived terms. The support information unit 104 further accesses the computer systems of the reference users to retrieve any data, including metadata, related to the supplemental web-based materials. For example, the support information unit 104 learns an amount of time spent viewing supplemental web-based materials, an origin of the supplemental web-based materials, a date that the supplemental web-based material was uploaded to a server's storage, a number of users that have accessed the supplemental web-based material.

The resource group unit 106 receives a topic of a subpart, associated supplemental web-based material, and additional data, including metadata, from the support information unit 104. The resource group unit 106 organizes the supplemental web-based materials together in groups. The grouping can be performed based on various factors, for example, level of difficulty, formatting, source, and time of creation. For example, the resource group unit 106 can determine that a chapter of e-book describing a manufacturing process and a chapter describing a welding process both originated from the same e-book, and group both chapters together. In another example, the resource group unit 106 can access the difficulty based on the vocabulary of the text. In another example, the resource group unit 106 can statistically analyze the supplemental web-based materials and determine that people tend to view both instances of the supplemental web-based materials together. For example, if an average user typically views a first instructional video on birds from content provider A, the average user will also view a second instructional video from content provider B. Based on the likelihood that the average viewer will view both videos, the videos are grouped together.

The sequence generation unit 108 creates a list of candidate sequences of the supplemental web-based materials. Initially, the sequence generation unit 108 determines the user's level of comprehension of a topic described in the primary web-based material. For example, whether the user's level of comprehension reach a certain point (e.g. a Eureka moment). A Eureka moment is a sudden understanding of a topic. Determining the user's level of comprehension can be performed through various techniques. In some embodiments of the present invention, the sequence generation unit 108 causes a graphical user interface displayed on the user's computer system 112 to display a prompt to ascertain the user's comprehension level. The prompt can ask the user to self-identify their level of comprehension of the topic. The prompt can also include a short quiz to assess the user's level of comprehension. In other embodiments of the present invention, the user's computer system 112 includes sensors 114 for detecting a level of comprehension. The sensors 114 include image capturing devices for capturing time-series data in the form of images of the user while viewing the primary web-based material. In addition to capturing image data, the sensors 114 detect the description of the content currently displayed on the user's computer system 112. By sensing both the user's image and the displayed content, the sequence generation unit 108 can correlate by time, an expression on the user's face and the content simultaneously displayed on the user's computer system 112. The image data is transmitted to a neural network as inputs. The neural network is trained to output the user's level of comprehension based on facial expression. In some instances, the sequence generation unit 108 determines that the user did not comprehend the topic. The sequence generation unit 108 correlates the content being viewed on the user's computer system 112 with the predicted level of comprehension from the neural network, to associate a topic with the level of comprehension. The sequence generation unit 108 performs a determination of comprehension each time after the user has viewed a web-based material.

After each calculation of comprehension, the sequence generation unit 108 calculates the aggregate user tendencies in terms of gaining a comprehension of the topic. For example, the sequence generation unit 108 determines each time that a web-based material is the last web-based material that a user digests, and each time that a user comprehends a last web-based material. The sequence generation unit 108 further aggregates user data to determine mean values for these tendencies. The sequence generation unit 108 uses these tendencies to generate a sequence of web-based materials. Upon determining the user's level of comprehension of the topic, the sequence generation unit 108 also accesses a user profile to determine whether the user has any preferences for the supplemental web-based materials, for example, format (e.g., video, audio, combination), language, origin, and tendency.

The sequence generation unit 108 analyzes the browser history of the reference users and determines a sequence in which the reference users accessed the supplemental web-based materials. For each reference user, the sequence generation unit 108 determines the sequence in which each user viewed the supplemental web-based materials until they understood the topic. Each reference user is determined to have understood a topic based on either ceasing to perform searches on a topic, or ceasing to view supplemental web-based materials.

The sequence generation unit 108 calculates a respective frequency that each supplemental web-based material appears in the reference user's sequences. For example, 40% of reference users viewed a first supplemental web-based material, 22% of users viewed a second supplemental web-based material, and 5% of reference users viewed a third supplemental web-based material. The sequence generation unit 108 then ranks each supplemental web-based materials in descending order in relation to the frequency.

The sequence generation unit 108 then performs a statistic analysis to determine a frequency among reference users for each determined sequence of supplemental web-based materials. In some embodiments of the present invention, the sequence generation unit 108 further compares each frequency to a threshold frequency to determine which sequences to retain. For example, the sequence generation unit 108 determines that 30% of reference users followed a sequence of viewing the first supplemental web-based material, then viewing the second supplemental web-based material, and finally followed by viewing the third supplemental web-based material. The sequence generation unit 108 then compares the 30% to a threshold frequency. If the 30% frequency rate is greater than the threshold frequency rate, the sequence generation unit 108 retains the sequence as a candidate sequence. If the 30% frequency rate is less than the threshold frequency rate, the sequence generation unit 108 removes the sequence as a candidate sequence.

The sequence generation unit 108 identifies candidate sequences for the user based on the frequency that a supplemental web-based material is included in a sequence, comparison between level of difficulty and user's level of comprehension, and the frequency rates of the sequence followed by other users to understanding the topic. Then the sequence generation unit 108 accesses the user's preferences and removes any candidate sequences that are incompatible with the user's preferences. For example, if the user's preferences indicate that the user does not accept audio-only files, the sequence generation unit 108 removes any sequences from the candidate sequences that include supplemental web-based materials in the form of an audio-only file. In this instance, the sequence generation unit 108 removes any sequences from the candidate sequences that include audio-only files. In some instances, the sequence generation unit 108 replaces an audio-only file with a comparable supplemental web-based material. For example, if the audio-only file was grouped with a video file by the resource group unit 106, the sequence generation unit 108 replaces the audio-only file with the video file.

The sequence generation unit 108 then searches a user's browser history to determine whether the user has previously viewed any of the supplemental web-based materials in the remaining candidate sequences. If any instance of the supplemental web-based materials in a candidate sequence was previously viewed by the user, the sequence generation unit 108 removes the sequence from the candidate sequences. The sequence generation unit 108 then causes the remaining candidate sequences to be displayed on a graphical user interface (GUI) of the user's computer system 112.

Figure 2A:
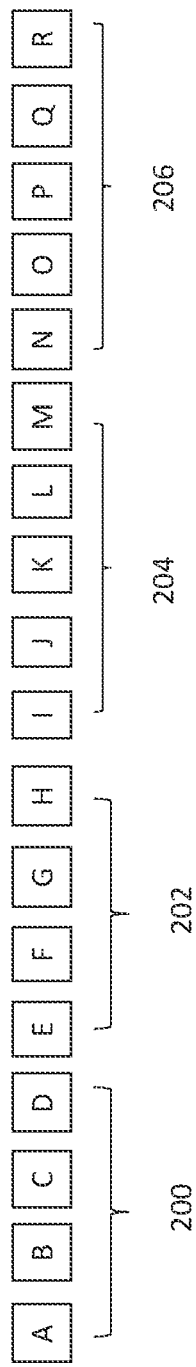
FIG. 2A illustrates groups of supplemental web-based materials according to one or more embodiments of the present invention.
Figure 2B:
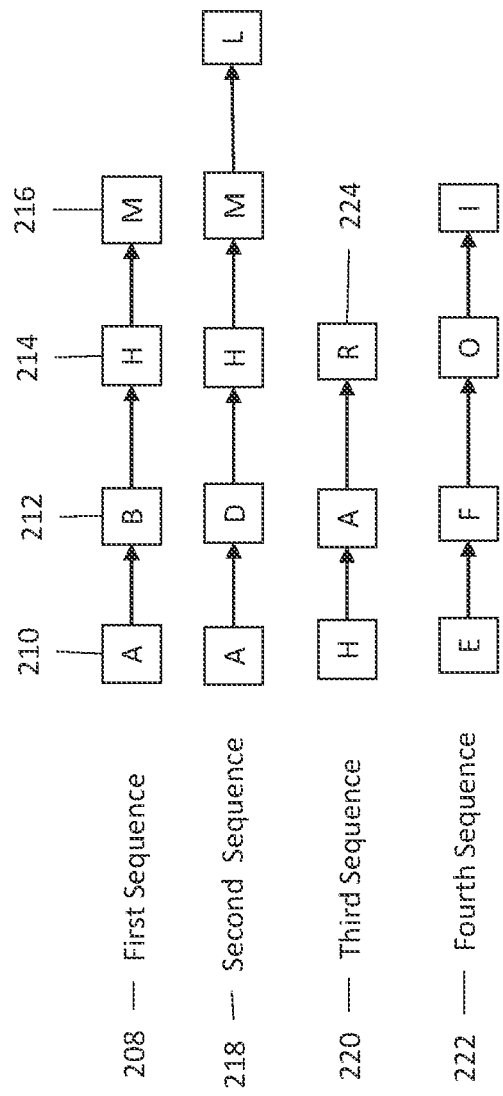
FIG. 2B illustrates candidate sequences of supplemental web-based materials according to one or more embodiments of the present invention.

Referring to FIGS. 2A and 2B, an exemplary process for generating sequences, is shown according to one or more embodiments of the present invention. Referring to FIG. 2A, it is shown that supplemental web-based material A-R have been grouped into a first group 200, a second group 202, a third group 204, and a fourth group 206. The support information unit 104 analyzes the browsing histories of reference users and retrieved supplemental web-based materials A-R which relate to a primary web-based material. The resource group unit 106 analyzes each supplemental web-based material A-R and grouped the supplemental web-based materials into the first group 200, the second group 202, the third group 204, and the fourth group 206. Referring to FIG. 2B four candidate sequences, sequence 1, sequence 2, sequence 3, and sequence 4 for learning a primary web-based material are shown in accordance with one or more embodiments of the present invention. The sequence generation unit 108 analyzes the browsing histories of reference users and identified these sequences that the reference users viewed the supplemental web-based materials.

For example, a college student is searching for supplemental web-based materials to help understand digital signal processing. The support information unit 104 searches the memory, including browser histories, of the reference users to determine which sites the reference users visited in relation to digital signal processing. For example, the support information unit 104 analyzes keys words in the uniform resource locators to determine whether any related to digital signal processing. The support information unit 104 reviews the search terms used by reference users and the search results to see if either the search terms or search results relate to digital signal processing. The support information unit 104 identifies supplemental web-based materials A-R, and grouped them into the first group 200, the second group 202, the third group 204, and the fourth group 206.

The sequence generation unit 108 analyzes the memory from the computer system of reference users, and identified the sequences for supplemental web-based materials A-R. It should be appreciated that additional sequences incorporating additional supplemental web-based materials are not illustrated. Each retrieved sequence is a candidate sequence that is compared with the college student's preferences to determine which candidate sequence would best lead the college student to a better understanding of digital signal processing. As an example, a first reference user followed the first sequence 208 to understand digital signal processing. The first reference user initially viewed supplemental web-based material A 210 from the first group 200. After viewing supplemental web-based material A, the first reference user viewed supplemental web-based material B 212 from the first group 200. The first reference user then viewed supplemental web-based material H 214 from the second group 202.

Finally, the first reference user viewed supplemental web-based material M 216 from the third group 204. The sequence generation unit 108 considers supplemental web-based material B 212 as building on the material provided by supplemental web-based material A 210. The sequence generation unit 108 considers supplemental web-based material H 214 as building on the material provided by supplemental web-based material A 210 and supplemental web-based material B 212. The sequence generation unit 108 further considers supplemental web-based material M 216 as building on the material provided by supplemental web-based material A 210, supplemental web-based material B 212, and supplemental web-based material H 214. As the first reference user did not access any more support digital signal processing related supplemental web-based materials after supplemental web-based material M 216, the sequence generation unit 108 considers the first sequence 208 as providing the first user with an understanding of digital signal processing. As seen in FIG. 2B, a second sequence 218 followed by a second user, a third sequence 220 followed by a third user, and a fourth sequence 222 followed by a fourth user are also illustrated.

The sequence generation unit 108 then analyzes the statistics related to each supplemental web-based material from the candidate sequences. The sequence generation unit 108 determines that 75% of the users view supplemental web-based material H 214 to understand digital signal processing. The sequence generation unit 108 further detects that the fourth sequence 222 does not include supplemental web-based material H 214, and eliminates this sequence as a candidate sequence. The sequence generation unit 108 then compares the college student's preferences with the supplemental web-based materials of each remaining candidate sequence. The sequence generation unit 108 determines that the college student dislikes journal papers. The sequence generation unit 108 detects that the third sequence 220 includes supplemental web-based material R 224, which is a journal paper. Therefore, the sequence generation unit 108 eliminates the third sequence 220 as a candidate sequence.

The sequence generation unit 108 then determines that the first sequence 208 and the second sequence 218 are acceptable candidate sequences for the college student. The sequence generation unit 108 further stores both the first sequence 208 and the second sequence 218 into linked lists, wherein each supplemental web-based material entry include a pointer to a subsequent supplemental web-based material. For example, the entry for supplemental web-based material A 210 includes a pointer to an address containing the uniform resource locator for supplemental web-based material B 212.

Figure 3:
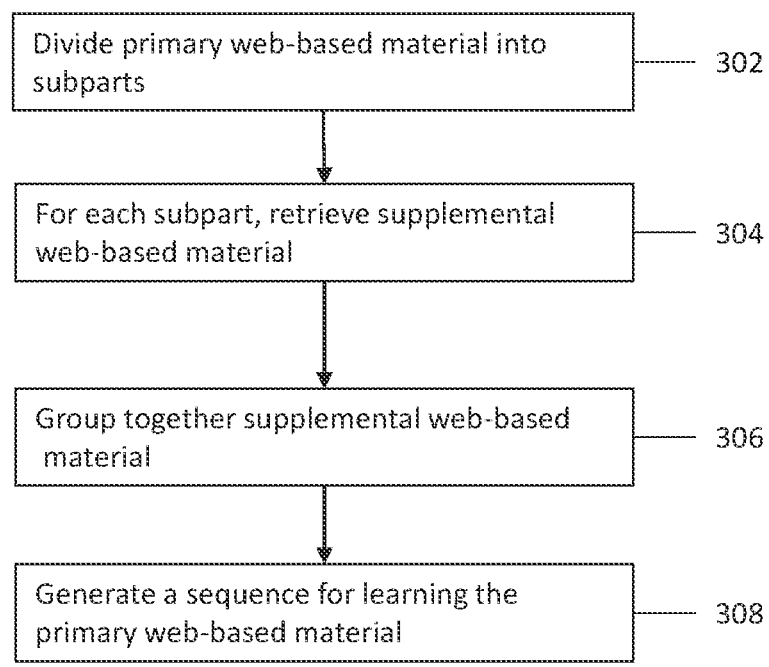
FIG. 3 illustrates a process flow for the efficient management and sharing of resources during e-learning according to one or more embodiments of the present invention.
Figure 3:

Referring to FIG. 3, a process 300 for the efficient management and sharing of resources during e-learning. At block 302, a content segmentation unit 102 receives a primary web-based material and identifies the subparts of the material. The primary web-based material includes video files, text files, and audio files accessed via the internet. The content segmentation unit 102 elects a technique to identify the subparts based on the format of the primary web-based material.

At block 304, a support information unit 104 retrieves supplemental web-based materials that relate to the subparts of the primary web-based material. The support information unit 104 employs a variety of neural networks for determining a topic described by the subparts. The neural networks are selected based on a format of the subpart. For example, if the subpart has a video component, the support information unit 104 selects a gated recurrent unit (GRU) neural network. It should be appreciated that all or a portion of the process 300 can be performed on the cloud computing environment 50 illustrated in FIG. 4, or the computer system 600 illustrated in FIG. 6.

At block 306, a resource group unit 106, analyzes the retrieved supplemental web-based material and generates groupings. The groupings are based on format, content, origin, level of difficulty, etc. For example, the resource group unit 106 receives a set of supplemental web-based materials that are textual documents. The resource group unit 106 converts each textual document into one or more word vectors. The resource group unit 106 then determines whether one or more textual documents should be grouped together based on a distance between the vectors. For example, the resource group unit 106 applies a cosine similarity function to determine a distance between the word vectors. The resource group unit 106 then compares the determined distances to a threshold distance. If the distance between two word vectors is less than the threshold distance, the two textual documents are grouped together. If, however, the distance between two word vectors is greater than the threshold distance, the two textual documents are not grouped together.

At block 308, a sequence generation unit 108 generates one or more sequences for learning the primary web-based material. The sequence generation unit 108 analyzes the browser histories of a group of reference users. The sequence generation unit 108 then determines a sequence of supplemental web-based materials that each user followed. Each of the sequences of the reference users are identified as candidate sequences. The sequence generation unit 108 then analyzes the user's preferences to eliminate candidate sequences that do not align with the user's preferences. The user's preferences can be determined based on a user's self-identified preferences, by analyzing historical data of the user's own search history, or any other appropriate method. The sequence generation unit 108 then eliminates any candidate sequences that do not align with the user's preferences. The sequence generation unit 108 then stores any remaining candidate sequence as a linked list, and further displays the remaining candidate sequences for the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
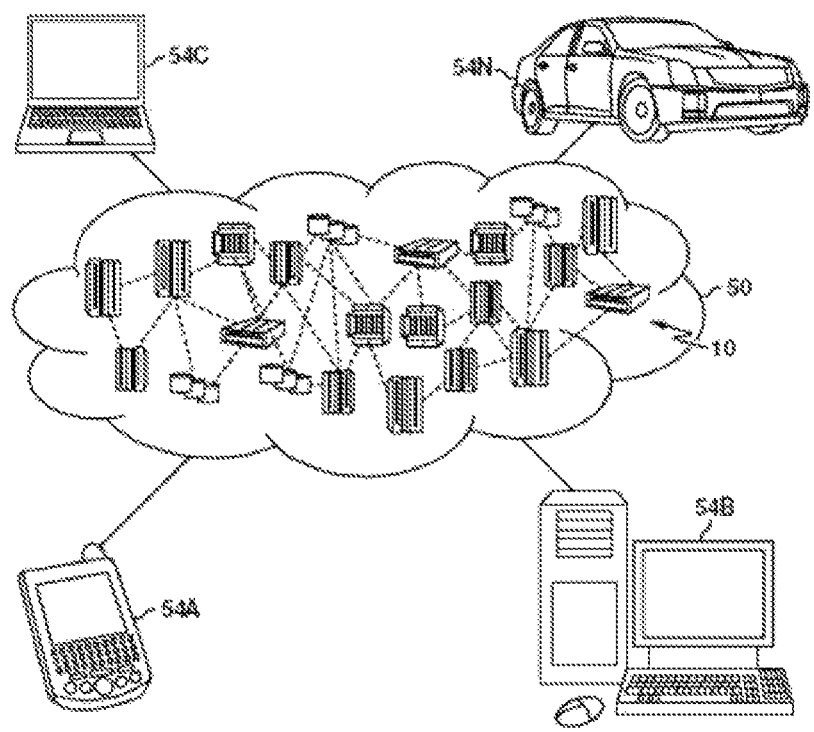
FIG. 4 illustrates a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
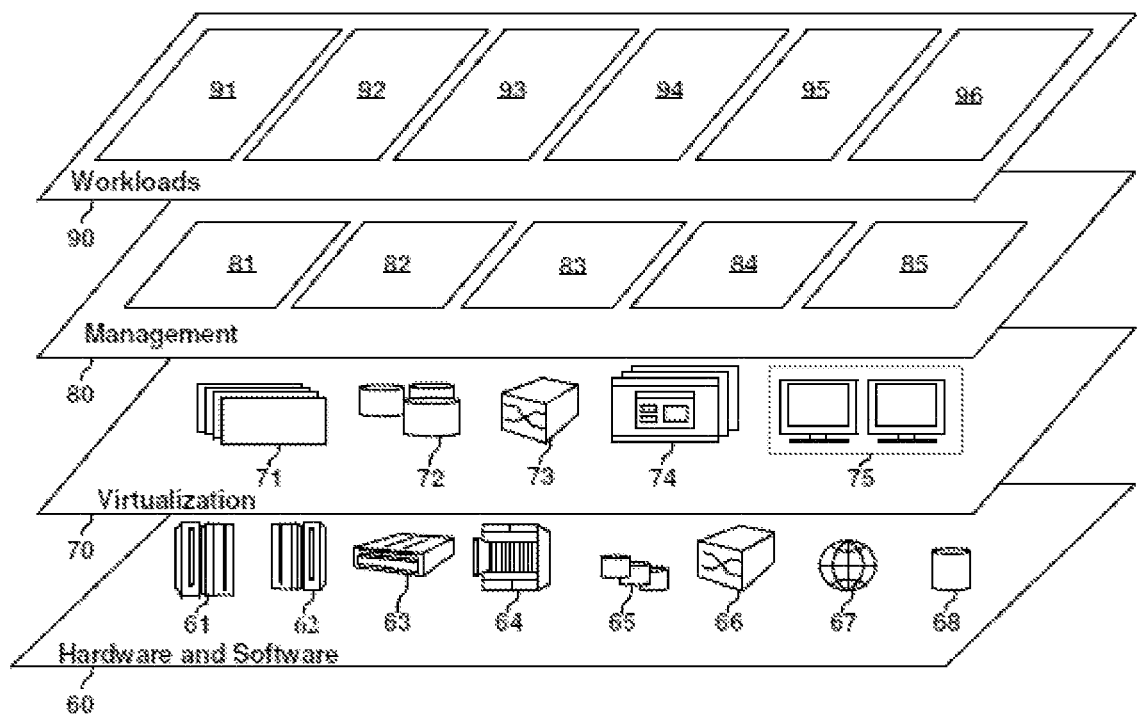
FIG. 5 illustrates abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and for the efficient management and sharing of resources during e-learning 96.

Figure 6:
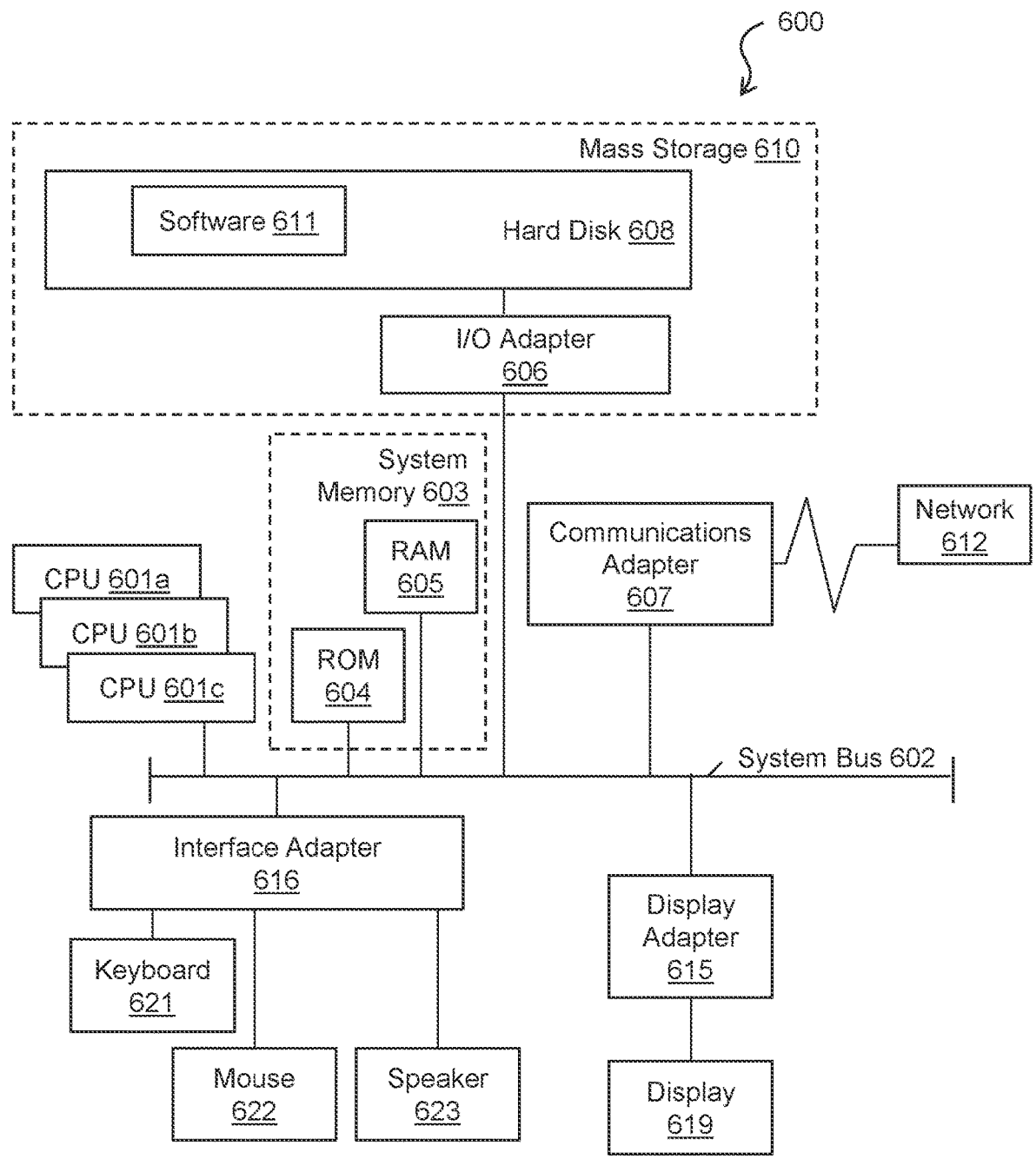
FIG. 6 illustrates a block diagram of a computer system for use in implementing one or more embodiments of the present invention.

In one or more embodiments of the present invention, the hardware/software modules in the system 100 from FIG. 1 can be implemented on the computer system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node, such as a node 10 of FIG. 5. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, an identity of a primary web-based material from a user, wherein the primary web-based material describes a topic;
   identifying subparts of the primary web-based material by performing natural language processing on the primary web-based material to identify subtopics of the primary web-based material wherein each identified subtopic is identified as a separate subpart;
   creating an index of the subparts of the primary web-based material, wherein the index identifies a memory address associated with each subpart of the primary web-based material;
   capturing a series of images including a facial expression of the user as the user view the primary web-based material;
   determining a comprehension level of the user as to the topic by analyzing facial expression of the user in the series of images;
   obtaining, by the processor, web-browsing histories of a plurality of reference users;
   identifying, by the processor, supplemental web-based materials in the web-browsing history of the plurality of reference users, wherein the supplemental web-based materials relate to the subparts; and
   generating, by the processor, a sequence of supplemental web-based materials for the user to follow to gain an understanding of the topic, wherein the sequence is determined based at least in part on an order in which the plurality of reference users viewed the supplemental web-based materials.

2. The computer-implemented method of claim 1, wherein the method further comprises:
   categorizing the supplemental web-based materials based on a level of difficulty; and
   selecting supplemental web-based materials to include in the sequence based on a comparison of the user's level of comprehension and the level of difficulty of the supplemental web-based materials.

3. The computer-implemented method of claim 1, wherein the method further comprises:
   determining similarities between respective supplemental web-based materials; and
   grouping the supplemental web-based materials based on the similarities.

4. The computer-implemented method of claim 1, wherein generating a sequence for the supplemental web-based materials comprises:
   obtaining personal preferences of the user;
   identifying a plurality a candidate sequences for the user based on sequences followed by the plurality of reference users; and
   selecting the sequence for the supplemental web-based materials based on the personal preferences.

5. The computer-implemented method of claim 4, wherein the method further comprises selecting the sequence for the supplemental web-based materials based on a level of difficulty of the supplemental web-based materials in addition to the personal preferences.

6. The computer-implemented method of claim 1, wherein the method further comprises creating hyperlinks for the user to access the generated sequence.

7. A system comprising:
   a memory having computer readable instructions; and
   one or more processors for executing the computer readable instructions, the computer readable instructions controlling the one or more processors to perform operations comprising:
      receiving an identity of a primary web-based material from a user, wherein the primary web-based material describes a topic;
      identifying subparts of the primary web-based material by performing natural language processing on the primary web-based material to identify subtopics of the primary web-based material wherein each identified subtopic is identified as a separate subpart;
      creating an index of the subparts of the primary web-based material subparts, wherein the index identifies a memory address associated with each subpart of the primary web-based material;
      capturing a series of images including a facial expression of the user as the user view the primary web-based material;
      determining a comprehension level of the user as to the topic by analyzing facial expression of the user in the series of images;
      obtaining, by the processor, web-browsing histories of a plurality of reference users;
      identifying supplemental web-based materials in the web-browsing history of the a plurality of reference users, wherein the supplemental web-based materials relate to the subparts; and
      generating a sequence of supplemental web-based materials for the user to follow to gain an understanding of the topic, wherein the sequence is determined based at least in part on an order in which the plurality of reference users viewed the supplemental web-based materials.

8. The system of claim 7, wherein the operations further comprise:
   categorizing the supplemental web-based materials based on a level of difficulty; and
   selecting supplemental web-based materials to include in the sequence based on a comparison of the user's level of comprehension and the level of difficulty of the supplemental web-based materials.

9. The system of claim 7, wherein the operations further comprise:
   determining similarities between respective the supplemental web-based materials; and
   grouping the supplemental web-based materials based on the similarities.

10. The system of claim 7, wherein generating the sequence for the supplemental web-based materials comprises:
    obtaining personal preferences of the user;
    identifying a plurality a candidate sequences for the t user based on sequences followed by the plurality of reference users; and
    selecting the sequence for the supplemental web-based materials based on the personal preferences.

11. The system of claim 10, wherein the operations further comprise selecting the sequence for the supplemental web-based materials based on a level of difficulty of the supplemental web-based materials in addition to the personal preferences.

12. The system of claim 7, wherein the operations further comprise creating hyperlinks for the user to access the generated sequence.

13. A computer program product comprising a computer readable storage medium having program instructions embodied therewith, the program instructions executable by a processor to cause the processor to perform operations comprising:
    receiving an identity of a primary web-based material from a user, wherein the primary web-based material describes a topic;
    identifying subparts of the primary web-based material by performing natural language processing on the primary web-based material to identify subtopics of the primary web-based material wherein each identified subtopic is identified as a separate subpart;
    creating an index of the subparts of the primary web-based material, wherein the index identifies a memory address associated with each subpart of the primary web-based material;
    capturing a series of images including a facial expression of the user as the user view the primary web-based material;
    determining a comprehension level of the user as to the topic by analyzing facial expression of the user in the series of images;
    obtaining, by the processor, web-browsing histories of a plurality of reference users;
    identifying supplemental web-based materials in the web-browsing history of the plurality of reference users, wherein the supplemental web-based materials relate to the subparts; and
    generating a sequence of supplemental web-based materials for the user to follow to gain an understanding of the topic, wherein the sequence is determined based at least in part on an order in which the plurality of reference users viewed the supplemental web-based materials.

14. The computer program product of claim 13, wherein the operations further comprise:
- categorizing the supplemental web-based materials based on a level of difficulty; and
- selecting supplemental web-based materials to include in the sequence based on a comparison of the user's level of comprehension and the level of difficulty of the supplemental web-based materials.

15. The computer program product of claim 13, wherein the operations further comprise:
- determining similarities between respective the supplemental web-based materials; and
- grouping the supplemental web-based materials based on the similarities.

16. The computer program product of claim 13, wherein generating the sequence for the supplemental web-based materials comprises:
- obtaining personal preferences of the user;
- identifying a plurality a candidate sequences for the user based on sequences followed by the plurality of reference users; and
- selecting the sequence for the supplemental web-based materials based on the personal preferences.

17. The computer program product of claim 16, wherein the operations further comprise selecting the sequence for the supplemental web-based materials based on a level of difficulty of the supplemental web-based materials in addition to the personal preferences.

* * * * *